Patented Oct. 20, 1931

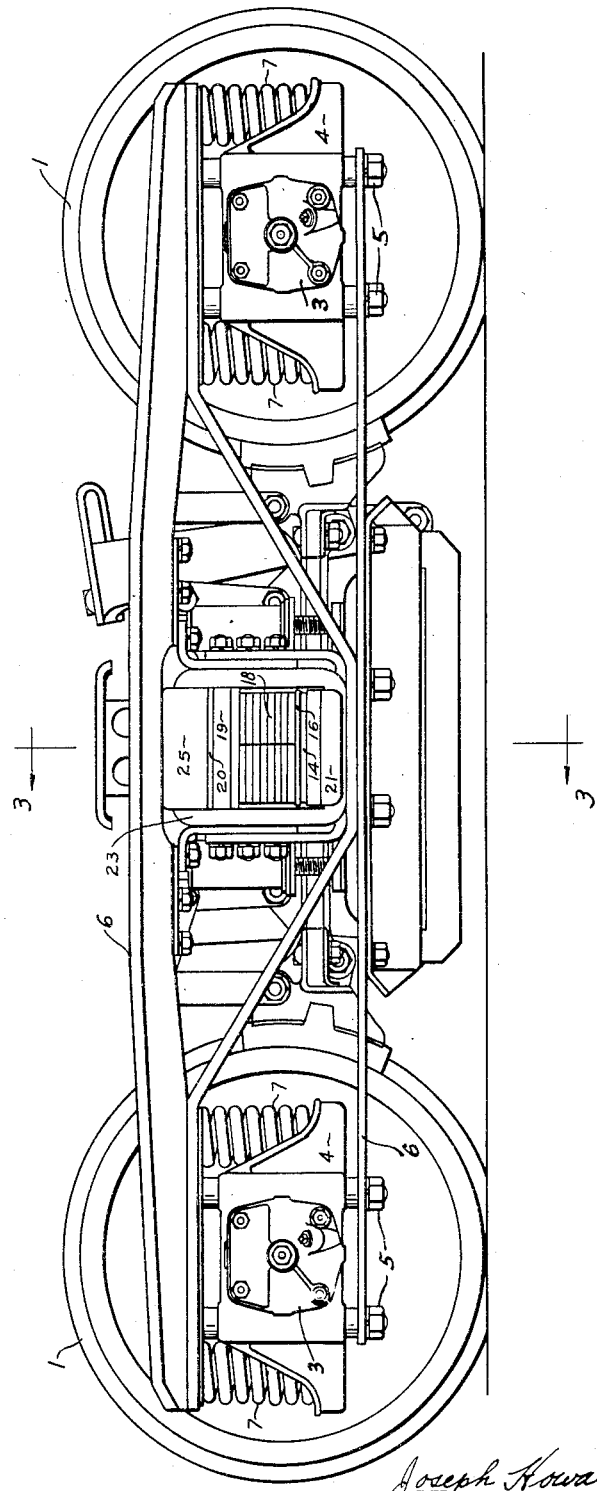

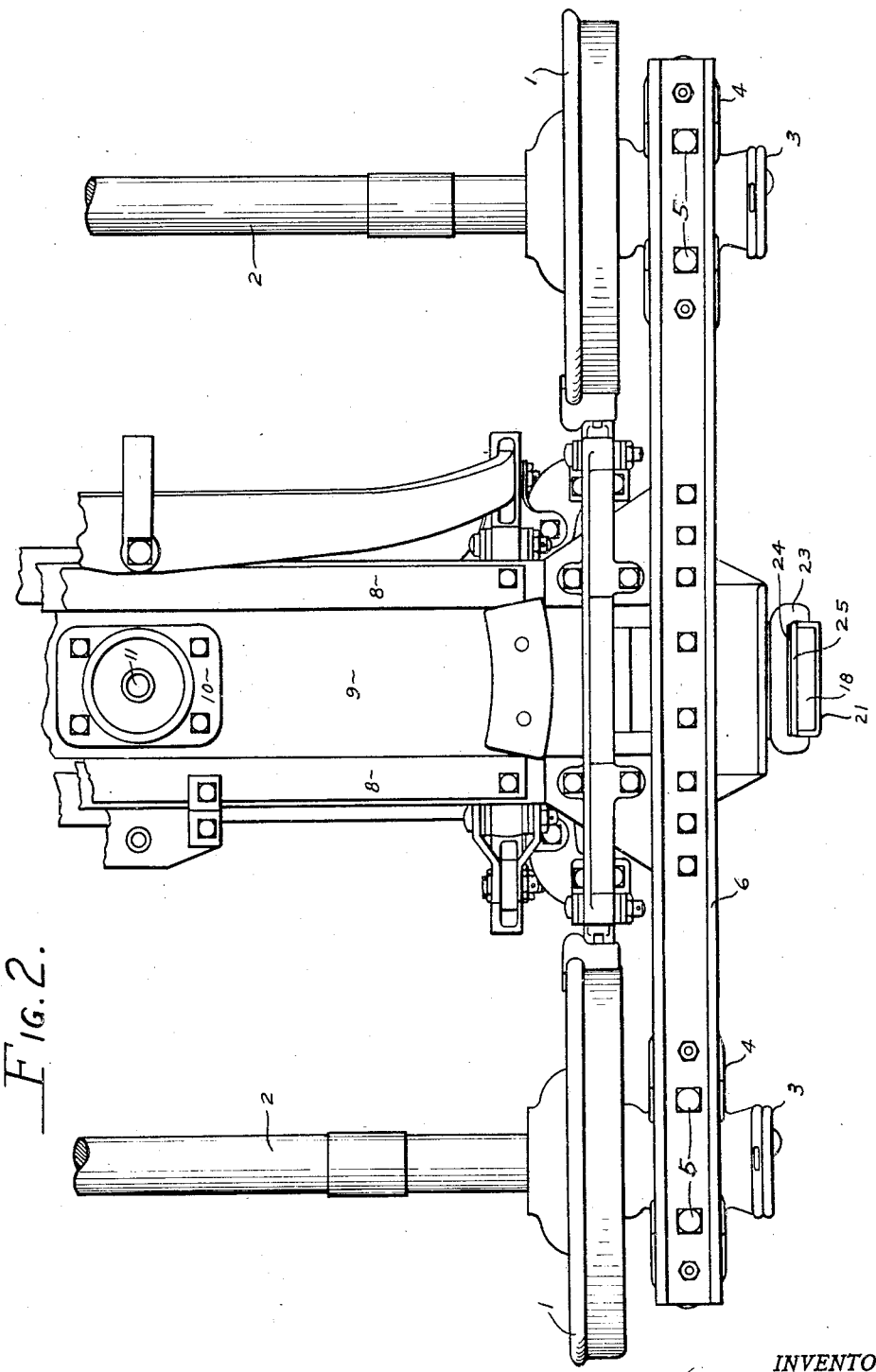

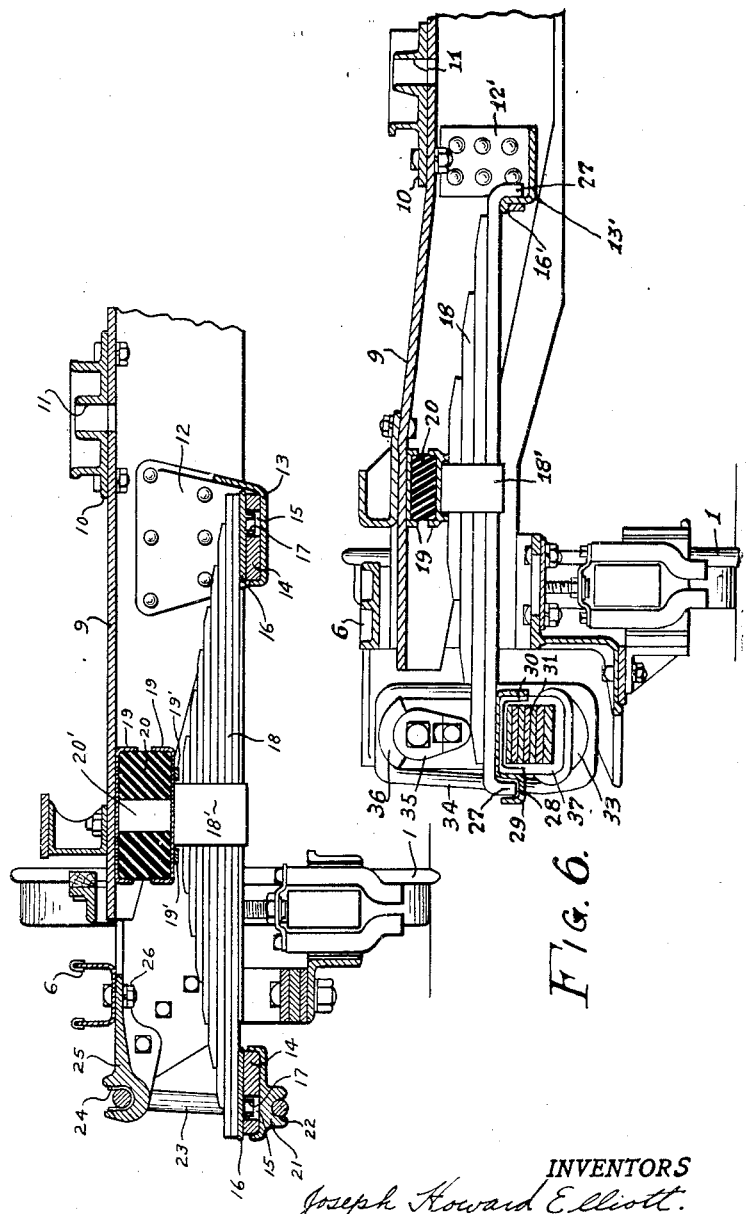

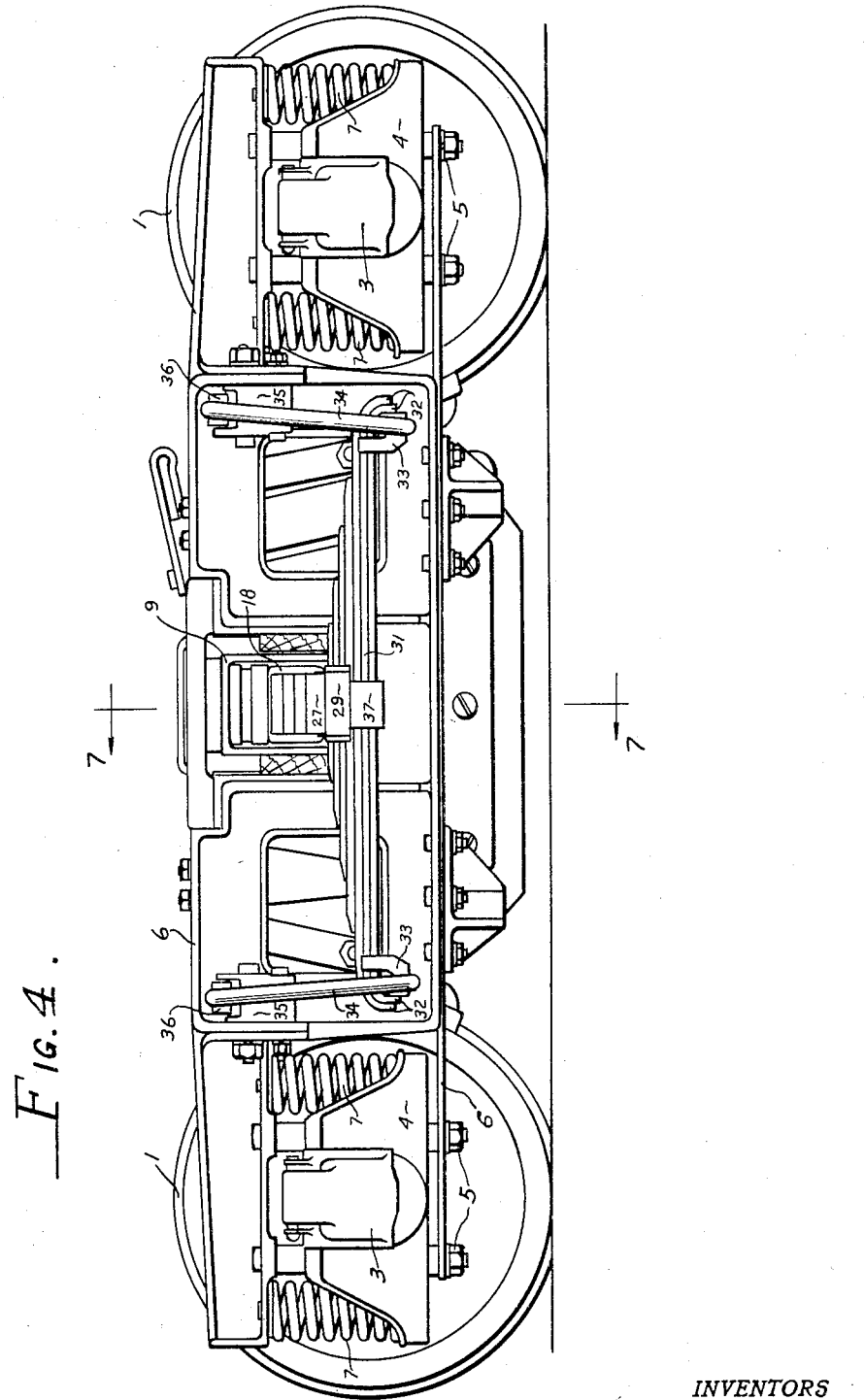

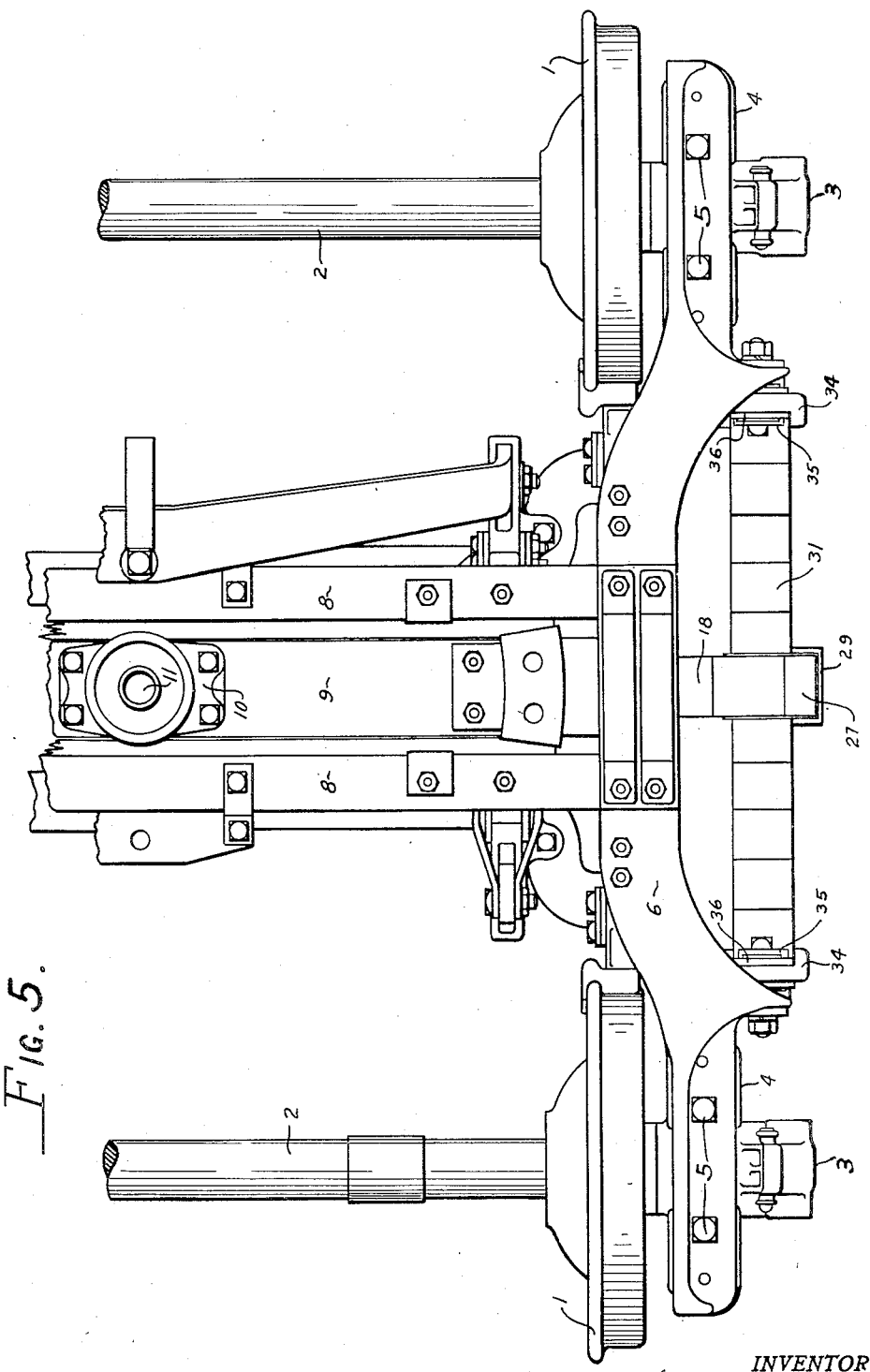

1,828,133

UNITED STATES PATENT OFFICE

JOSEPH H. ELLIOTT AND RAGNAR A. NORBOM, OF CINCINNATI, OHIO, ASSIGNORS TO THE CINCINNATI CAR CORPORATION, OF CINCINNATI, OHIO, A CORPORATION OF OHIO

TRUCK FOR HIGH SPEED INTERURBAN CARS

Application filed June 5, 1929. Serial No. 368,456.

It is the object of this invention to provide improved means of supporting the bolster on car trucks. It is more specifically the object of this invention to provide a cantilever leaf spring between the truck frame and the truck bolster so that the bolster will be supported primarily on the cantilever spring. There is one spring near each end of the bolster.

It is a further object of this invention to provide between the cantilever spring and the bolster one or more helical springs or rubber blocks to form a cushion between the cantilever springs and the bolster. These helical springs or rubber blocks ride on the cantilever semi-elliptic leaf springs. Thus there is combined the spring connections of the cantilever springs and the helical springs or rubber blocks to provide a smoother support for the car and a support that is less likely to transfer to the car jolts and jars produced in the truck.

This arrangement of long, highly flexible and smooth-acting cantilever springs, to which is added the helical springs or rubber blocks, is to iron out or absorb the minor vibrations which pass through the cantilever springs without causing the springs to vibrate because of the friction due to the contact of the leaves with each other. Another result of using the cantilever springs is that the outer ends of the springs may be supported by flexible link connections between the springs and the truck frames.

These and other advantages will appear from the description taken in connection with the drawings.

Referring to the drawings:

Figure 1 is a side elevation of a complete truck.

Figure 2 is a plan view thereof.

Figure 3 is a section on the line 3—3 of Figure 1.

Figure 4 is a side elevation of a complete truck showing a modified form of supporting the outer ends of the cantilever springs.

Figure 5 is a plan view of the form shown in Figure 4.

Figure 6 is a section taken on the line 7—7 of Figure 4.

The numeral 1 is used to designate the wheel of a truck in which the axle is indicated by the numeral 2. The truck is composed of two axles with wheels on each end thereof connected by a frame in the manner ordinarily found in street cars and railway cars.

The numeral 3 is used to designate a journal box, which engages and fits over the outer ends of the axles. The numeral 4 is used to designate journal brackets which are held in relation to the truck frame 6 by means of bolts 5. The parts are so constructed that the frame may move up and down while being supported by the journal box.

For the purpose of allowing the up and down spring movement of the frames there are springs 7 located between the frame and the journal brackets. Connecting the frame members on each end of the truck there are transom members 8. There are two of these transom members for each truck, between which is located a bolster 9. This invention particularly relates to the means by which this bolster is supported on the frames of the truck. The bolster 9 is the transverse car support.

At the center of the bolster there is a bearing plate 10, which has a king pin socket 11 therein. Near the center and extending from the lower part of the bolster are two bracket members 12. These brackets are so constructed as to form a bench or seat in which one end of a spring rests and is supported. The spring seat is in the shape of a trough and is indicated by the numeral 13. In this spring seat is a packing 14 of some resilient material, such as rubber, which has a hole 15 therein.

On the under side of the cantilever spring 18 there is a plate 16 which has a lug 17 thereon adapted to fit into the hole 15. The cantilever spring is built up of different leaves and is in the shape of an ordinary leaf spring with the exception that the leaves are substantially straight. The plate 16 may be of any suitable material and attached to the ends of the spring in such a way as to be affixed thereto so that the spring is permanently held in the bracket. The central part of the spring is surrounded by a cuff member 18', which not only serves the purpose of holding the spring parts together but also serves the purpose of holding the spring in relation to a rubber block mounted on the under side of the ends of the bolster by means of pin 20'.

For the purpose of providing a support and holding means for the rubber block or resilient member there is provided a casing 19. Within this casing there is a rubber block 20. While in Figure 3 this member is shown to be composed of rubber, or some similar material, it may be a spring or any means of resiliently forming a connection between the spring and the bolster. On the lower member of the casing 19 are two stop members 19', which engage opposite sides of the cuff member 18' to aid in holding the spring against longitudinal movement in relation to the bolster.

The numeral 21 is used to designate a bearing block, which has in the lower part thereof a circular seat 22 which receives therein the lower end of a link member 23. The link member 23 is supported at its upper end in a seat 24 of a bracket 25 which extends out from and is supported by the car truck frame by means of bolts 26. The link 23 is supported by the bracket 25 in such a way that it has transverse swinging movement in relation to the truck, thereby permitting the bolster to have a similar swinging movement in relation to the truck. This swinging movement of the bolster is not only effected by the pivotal connection of the link 23 with the bracket 25, but is also aided by the pivotal connection between the link 23 and the bearing block 21.

This bearing block provides a seat similar to the seat found in the bracket 12 for supporting a packing member 14 similar to that found in the bracket. This packing member has a hole 15 which receives a lug 17 on a plate 16, similar to the plate on the other end of the spring and in engagement with the bracket. By means of these holes and lugs the ends of the spring are supported in such a way that the supports cannot move longitudinally of the spring.

It is obvious from an inspection of Figure 3 that the bolster 9 is entirely supported by means of the spring 18, which has one end thereof in engagement with and supported by the bracket 12, while the other end of the spring is supported by the link 23 resting in the seat 24 of the bracket 25 on the truck frame, the intermediate part of the spring engaging the resilient rubber block 20 on the end of the bolster so that the bolster is entirely supported by means of the link 23 on each side of the truck.

Instead of having the outer ends of the spring 18 supported by a swinging link 23, these ends may be supported by springs as indicated in Figures 4, 5 and 6. The truck frame, as shown in these figures, is substantially the same as that shown in Figures 1, 2 and 3, the essential difference being in the manner of supporting the outer ends of the cantilever spring. However, in this form the ends of the cantilever springs have the lower leaf thereof bent down and in engagement with the bracket seat 13' having an upturned lip 16', as indicated in Figure 6. The bracket in this figure is indicated by the numeral 12', and the bent end of the spring is indicated by the numeral 27.

The outer ends of the cantilever springs rest in a seat 28 formed in a bearing plate 29. The bearing plate 29 forms a saddle 30 which extends across the spring 31 and provides a support for the outer ends of the cantilever springs in being supported by the spring 31. The outer ends of the spring 31 are bent down, as indicated by the numeral 32, and engage bearing blocks 33. These bearing blocks are adapted to receive the bent-down ends of the spring and also adapted to engage the sides of the spring to prevent movement.

In the lower part of the bearing blocks there is a circular seat adapted to receive the lower part of a link 34. Suitably attached to the frame 6 are brackets 35 which support on the upper side thereof bearing blocks 36. These bearing blocks 36 have circular seats therein for supporting the upper ends of the links 34. By this means the links 34 are supported by the frame 6 and carry the spring 31 so that it may have a limited degree of swinging movement longitudinally of the truck.

Around the central part of the spring 31 there is a cuff member 37 which serves to hold the leaves of the spring together, and also serves as a bearing surface for the bearing plate 29 which rests upon this cuff member and supports the outer ends of the spring 18 in this form of bolster support. In all other respects the truck shown in Figures 4, 5 and 6 is similar to the truck shown in Figures 1, 2 and 3. In the form shown in Figures 4, 5 and 6 the bolster is supported by three resilient members, the cantilever spring, the resilient connection between the end of the bolster and the middle of the cantilever spring and the longitudinal spring that supports the outer end of the cantilever spring. By this means all of the shocks of the truck are destroyed, and the car body is supported free from disturbance thereby, and a longitudinal and a limited transverse swinging is permitted.

We desire to comprehend within our invention such modifications as may be clearly embraced within our claims and the scope of our invention.

Having thus fully described our invention, what we claim as new and desire to secure by Letters Patent, is:

1. In a car truck, a transverse channel member, a pair of spring members resiliently supported at one end by said transverse member and engaging the under side of said transverse member, between the walls thereof and resilient means pivotally supported by said car truck and engaging the other end of said springs for supporting the transverse member on said car truck.

2. In a car truck, a transverse channel member, a pair of brackets near the intermediate part of said transverse member attached to the walls thereof, a resilient member at each end of said transverse member, a pair of spring members supported at one end by said brackets and engaging near the intermediate parts thereof with said resilient members, and swinging spring means on said car truck for engaging and supporting the other ends of said spring members for supporting the transverse member on said car truck.

3. In a car truck, a transverse channel member, a pair of brackets near the intermediate part of said transverse member attached to the walls thereof, a resilient member at each end of said transverse member, a pair of spring members supported at one end by said brackets and engaging near the intermediate parts thereof with said resilient members, and swinging leaf spring means on said car truck for engaging and supporting the other ends of said spring member for supporting the transverse member on said car truck.

4. In a car truck, a transverse channel member, a pair of brackets near the intermediate part and fastened to the sides thereof, a shock-absorbing member on the under side of each end of said transverse member, supporting means for said transverse member having one of the ends thereof supported by said bracket and the intermediate part thereof engaging said shock-absorbing means, and means on said car truck for resiliently and swingingly supporting the other ends of said supporting means whereby the transverse member may have a swinging movement transverse to the car truck.

5. In a car truck, a transverse channel member having a pair of brackets thereon between the walls thereof, a spring attached to each end of said transverse member with one end thereof engaging said brackets, spring members supporting the other ends of said springs, and link means on said car truck engaging said second springs to support them for swinging movement.

6. In a car truck, a transverse member having brackets thereon located near the center, cushion means located adjacent the ends of said transverse member, cantilever spring means engaging at one end said brackets and said cushion means, and spring means extending longitudinally of the truck and engaging the other ends of said cantilever springs, and means for supporting said last-named springs from said car truck.

7. In a car truck, a pair of links supported by said car truck, a leaf spring supported at each end by one of said links, a transverse member having a bracket thereon and a cushioning means and a spring engaging said bracket, and cushioning means supported by said first-named spring for supporting the transverse member.

8. In a car truck, means on each side of said car truck for swingingly supporting a leaf spring, a transverse member having brackets located near the center thereof, and cushioning means adjacent the ends thereof, springs engaging said bracket members and said cushioning means and supported by said first-named springs whereby the transverse member is supported by said car truck.

9. In a car truck, a pair of swinging links on said truck, a longitudinally extending spring supported at each end by said links for transverse and longitudinal swinging movement, a bolster, and a cantilever spring attached to said bolster at one end and supported by said longitudinal spring at the other end whereby the bolster has a limited transverse and longitudinal movement.

10. In a car truck, a pair of swinging links on each side of said truck, a longitudinally extending spring on each side of said truck supported at its ends by said links for a limited transverse and longitudinal swinging movement, a bolster, and a cantilever spring attached to each end of said bolster and supported by said longitudinal springs.

11. In a car truck, a pair of swinging links on each side of said truck, a longitudinally extending spring on each side of said truck supported at its ends by said links, a bolster having a cushion member at each end and a cantilever spring on each end of said bolster engaging a cushion member and supported at one end by the longitudinal spring so that the bolster has a limited amount of transverse and longitudinal movement.

12. In a car truck, a pair of swinging links on each side of said truck, a longitudinally extending spring supported at its ends by each pair of links, a bolster having a cushion member at each end and a cantilever spring for each end of said bolster attached at one end near the center of said bolster and engaging under a cushion member and supported at its other end by the central part of one of said longitudinal springs so that the bolster has longitudinal and transverse movement.

13. In a car truck, a pair of swinging links on each side of said truck, a longitudinally extending leaf spring supported at its ends by each pair of links, a bolster having a pair of brackets near its center and a cushion member at each end, and a cantilever spring attached at one end to each of said brackets and engaging near its center said cushion member and supported at its other end by one of said longitudinally extending springs so that the bolster has longitudinal and transverse movement.

14. In a car truck, side frames, transoms connecting said frames, a bolster between said transoms, a transverse and a longitudinal spring supporting each end of said bolster, and swinging means on each frame engaging each end of each longitudinal spring so that the bolster has a limited transverse and longitudinal movement.

15. In a car truck, a pair of links on each side of said truck, a leaf spring for each pair of links supported at each end by a link, a saddle member extending across the central part of each leaf spring and down the sides thereof and forming on one side a spring seat, a bolster having near its center a pair of brackets, each bracket being turned up on one part to form a lip, and a cantilever spring for each end of said bolster having its ends bent down, one end of each of said springs resting on a saddle with the bent-down part in one of said seats and the other end of each of said springs engaging a bracket with the bent-down part engaging over a lip.

16. In a car truck, a pair of links on each side of said truck, a leaf spring for each pair of links supported at each end by a link, a saddle member extending across the central part of each leaf spring and down the sides thereof and forming on one side a spring seat, a bolster having near its center a pair of brackets, each bracket being turned up on one part to form a lip, a cantilever spring for each end of said bolster having its ends bent down, one end of each of said cantilever springs resting on a saddle with the bent-down part in one of said seats and the other end of each of said springs resting on a bracket with the bent-down part engaging over the lip, and a cushion member between each end of the bolster and its cantilever spring so that the bolster is supported by the truck for longitudinal and transverse movement.

17. In a car truck, a pair of links on each side of said truck, a longitudinally extending leaf spring for each pair of links supported at each end by a link, a saddle member extending across the central part of each leaf spring and down the sides thereof and forming on one side a spring seat, a bolster having near its center a pair of brackets, each bracket being turned up on one part thereof to form a lip, a transversely extending cantilever spring for each end of said bolster having its ends bent down, one end of each of said cantilever springs resting on a saddle with the bent-down part in the seat and the other end of each of said springs resting on a bracket with the bent-down part engaging over the lip, and a cushion member between each end of the bolster and its cantilever spring so that the bolster is supported by the truck for both transverse and longitudinal movements.

In testimony whereof, we affix our signatures.

JOSEPH H. ELLIOTT.
RAGNAR A. NORBOM.